United States Patent
Fung (10) Patent No.: US 11,554,323 B2
(45) Date of Patent: Jan. 17, 2023

(54) SYSTEM AND METHOD FOR PRECISE POSITIONING WITH TOUCHSCREEN GESTURES

(71) Applicant: Riot Games, Inc., Los Angeles, CA (US)

(72) Inventor: Kam-Wing Fung, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 17 days.

(21) Appl. No.: 17/018,503

(22) Filed: Sep. 11, 2020

(65) Prior Publication Data

US 2022/0080308 A1    Mar. 17, 2022

(51) Int. Cl.
*A63F 13/426* (2014.01)
*A63F 13/5372* (2014.01)
*A63F 13/2145* (2014.01)
*A63F 13/847* (2014.01)

(52) U.S. Cl.
CPC ........ *A63F 13/426* (2014.09); *A63F 13/2145* (2014.09); *A63F 13/5372* (2014.09); *A63F 13/847* (2014.09); *A63F 2300/1075* (2013.01); *A63F 2300/306* (2013.01)

(58) Field of Classification Search
CPC ............... A63F 13/426; A63F 13/2145; A63F 13/5372; A63F 13/847; A63F 2300/1075; A63F 2300/306
See application file for complete search history.

(56) References Cited

U.S. PATENT DOCUMENTS

| | | | | |
|---|---|---|---|---|
| 9,239,648 B2* | 1/2016 | Smus | ...................... | G06F 3/044 |
| 9,304,628 B2* | 4/2016 | Wei | ...................... | G06F 3/0421 |
| 9,645,693 B2* | 5/2017 | Smus | ...................... | G06F 3/044 |
| 9,696,899 B2* | 7/2017 | Kim | ...................... | G06F 1/1616 |
| 9,811,926 B2* | 11/2017 | Kangas | ................. | G06T 11/80 |
| 10,042,544 B2* | 8/2018 | Helfman | ................. | G06F 3/017 |
| 10,372,317 B1* | 8/2019 | Arnold | ................ | G06F 3/04842 |

(Continued)

OTHER PUBLICATIONS

International Search Report and Written Opinion received for PCT Patent Application No. PCT/US2021/048656, dated Dec. 2, 2021, 14 pages.

*Primary Examiner* — David L Lewis
*Assistant Examiner* — Matthew D Hoel
(74) *Attorney, Agent, or Firm* — Shook, Hardy & Bacon LLP (57) ABSTRACT

A system and method for precise positioning of items such as communication pings in a map of a multiplayer game with touchscreen gestures. Specifically, the method can include displaying a dynamic image or map on a touchscreen and receiving a touch gesture thereon. The touch gesture can begin at a tool selection icon and end at a release location within the map. Then the method can include, in response to the touch gesture, displaying a precision placement tool that depicts a portion of the map obscured by the received touch gesture. The depiction can be an enlarged depiction of the obscured portion and is displayed outside of the obscured portion. Finally, the method can include displaying a change to the map at the release location when the touch gesture ends. Specifically, at the release location, items such as communication pings can be placed onto the map.

20 Claims, 9 Drawing Sheets

(56) References Cited

U.S. PATENT DOCUMENTS

| | | | |
|---|---|---|---|
| 10,474,345 B2 * | 11/2019 | Shey | G06T 11/60 |
| 10,702,776 B2 * | 7/2020 | Ying | A63F 13/2145 |
| 10,877,659 B2 * | 12/2020 | Helfman | G06F 3/017 |
| 11,157,152 B2 * | 10/2021 | Koetter | G06F 3/04842 |
| 2011/0304557 A1 | 12/2011 | Wilburn et al. | |
| 2014/0028578 A1 * | 1/2014 | Dinh | G06F 3/04883 |
| | | | 345/173 |
| 2015/0268744 A1 * | 9/2015 | Au | G06F 3/041 |
| | | | 345/173 |
| 2016/0306545 A1 | 10/2016 | Voisin et al. | |
| 2018/0350099 A1 | 12/2018 | Yerkes et al. | |
| 2019/0030431 A1 * | 1/2019 | Zhang | A63F 13/5378 |

* cited by examiner

SYSTEM AND METHOD FOR PRECISE POSITIONING WITH TOUCHSCREEN GESTURES

BACKGROUND

As online multiplayer gameplay moves to mobile devices and handheld touchscreen devices, size constraints of such mobile device touchscreens present various challenges. For example, multiplayer online battle arena (MOBA) games or other multiplayer strategy video games oftentimes involve vast virtual worlds or virtual maps in an isometric perspective view. For navigation, communication, and other in-game actions and communication within these virtual worlds, maps are often selectable for display within the game. However, such maps face various disadvantages on touchscreens. For instance, maps on generally smaller touchscreens are presented with a decreased size that is difficult to see. More so, fingers or thumbs can obscure portions of the map when being manipulated through touch gestures. This can lead to decreased accuracy when performing operations that require precision placement within a map, such as placing communication pings or other such reference markers onto the map and/or within the virtual world of the game.

To address these challenges, various games and apps on mobile devices and handheld touchscreen devices provide features such as panning and/or pinch to zoom tools and interfaces. However, while such solutions can increase accuracy, they are generally too slow for live game play. For instance, MOBA games can present a variety of objects, and game pieces are often animated and movable in real-time, thus requiring increased processing resources. Furthermore, panning and pinch to zoom tools and interfaces also limit how much of the map can be viewed at one time, which is disadvantageous in strategy games where seeing a big-picture view of the game's virtual world via maps can be beneficial in developing a game strategy.

SUMMARY

Embodiments of the present disclosure relate to precise positioning with touchscreen gestures. More specifically, embodiments relate to systems and methods for viewing portions of a dynamic image (such as a map in a multiplayer video game) that is obscured by touchscreen gestures. In essence, the described embodiments facilitate the ability to view in real time what is beneath a player's thumb or finger in contact with a touchscreen in order to accurately place communication pings onto a map.

In some example embodiments, precise location selection on a touchscreen during a multiplayer game is accomplished via a precision placement tool that displays in real-time an enlarged depiction of a portion of the map obscured by a touch gesture, while a majority of the remainder of the map is still simultaneously displayed for the player. For instance, a method herein can include the steps of displaying the dynamic image or map on a touchscreen and receiving a touch gesture thereon. The touch gesture can begin at a tool selection icon and end at a release location within the map. For example, the touch gesture can begin by a player's finger touching the tool selection icon and dragging of that finger across the map to the release location. The method can then include, in response to the touch gesture, displaying a precision placement tool that depicts a portion of the map obscured by the received touch gesture. The depiction can be an enlarged depiction of the obscured portion and is displayed outside of the obscured portion. Finally, the method can include displaying a change to the map at the release location when the touch gesture ends. Specifically, by way of non-limiting example, operations such as communication pings, or items that signal communications between players, can be performed or placed onto the map at the release location.

In some embodiments, the precision placement tool can display the obscured portion of the map at a fixed location relative to the map. For instance, the obscured portion under a finger making a touch gesture can be presented at a fixed location of a user interface. In some other embodiments, the precision placement tool can display the obscured portion of the map at a fixed distance away from the obscured portion. More specifically, the precision placement tool can be virtually or visually tethered to the obscured portion throughout the touch gesture (e.g., as the finger drags across the map to the release location), such that the obscured portion is presented at a fixed distance relative to the finger making the touch gesture. In some further embodiments, the precision placement tool can include visual context indicators communicating additional information to the player during the touch gesture. For example, the additional information can include what type of signal will be released at the release location and, when passing over some fixed objects, can include what type of fixed object the signal will be associated with if released at a current location. In some embodiments, the precision placement tool is selectable from a menu or array of different precision placement tools for communicating different communication pings.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

The online multiplayer video gaming industry has gained immense popularity across all demographics around the globe. As online multiplayer video games move to mobile platforms for play on touchscreen devices, such as tablets and smart phones, some modifications are required for both how the game is displayed and how users interface with it (e.g., control the game). For instance, size constraints of touchscreens present various challenges, such as game elements appearing too small. However, limited screen size and processing capabilities of such mobile devices have presented challenges in providing a full-featured multiplayer video game via a mobile platform.

Current solutions to these constraints primarily include panning and/or pinch to zoom operations and interfaces. Pinch to zoom operations can increase accuracy of defining target locations during gameplay, for example, because they allow a close-up view of a particular location. Likewise, panning operations conveniently allow navigating maps while still in such a zoomed-in view. However, these solutions are often too slow for live game play, particularly due to the large processing resources required for the various animations and movable-in-real-time game pieces involved in multiplayer online battle arena (MOBA) games, for example. Panning and pinch to zoom operations also limit how much of the map can be viewed at one time, complicating a player's ability to see a big-picture view of the game's virtual world while developing a game strategy.

As such, various embodiments of the present disclosure are directed to a system and computer-implemented method for selecting or in other words defining a precise location of a dynamic image, such as a live action map on a MOBA game. This precise location selection is accomplished via a precision placement tool that displays in real-time an enlarged depiction of a portion of the map obscured by a touch gesture. Specifically, by implementation of this precision placement tool, portions of the map obscured by the player's fingers or thumbs (or other input tool, such as a stylus) while performing the touch gesture on a mobile device touchscreen can be viewed in real-time, while a remainder of the map is still simultaneously displayed for the player. The portion of the map obscured by the player's fingers or thumbs can also be depicted as zoomed in or enlarged to assist the player in accurately placing items such as communication pings onto the map. A communication ping, as is generally known in the art, is facilitated by a player selecting a message and a defining a location on a map, and communicating the selected message and defined location to his or her teammates (e.g., via a network), such that the teammates can receive the message and the location. The precision placement tool can display the obscured portion of the map at a fixed location relative to the map (e.g., an upper left-hand corner of the map) or at a location that is a constant distance away from the obscured portion and virtually or visually tethered to the obscured portion.

In some embodiments, the precision placement tool includes visual context indicators, such as an icon indicating a type of communication ping (e.g., a "send help now" message) to be placed upon activation of the precision placement tool on the map (i.e., release of a touch gesture controlling the precision placement tool) and/or an icon indicating the type of object in the virtual game that the communication ping will be attached to or associated with (e.g., a fixed tower within the game) if the touch gesture is released in its current location. Additionally or alternatively, the visual context indicators can include changing colors displayed around or on the precision placement tool. In some embodiments, the precision placement tool is selectable from a menu or array of different precision placement tools for communicating different communication pings (e.g., "send help now," "attack this location", etc.).

Figure 1A:
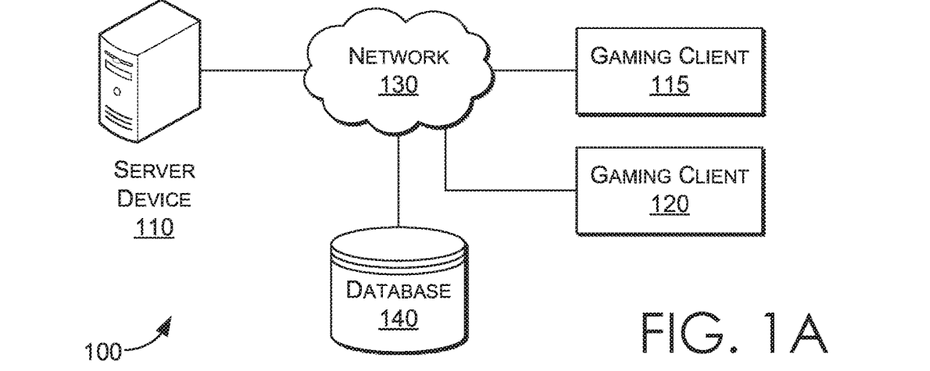
FIG. 1A depicts an exemplary operating environment in accordance with some embodiments of the present disclosure.

Turning now to FIG. 1A, a schematic depiction is provided illustrating one exemplary operating environment 100 of which an embodiment of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1A includes a server device 110 that provides a service to one or more client devices, such as gaming clients 115,120, for instructing game play and/or settings in a virtual gaming environment over a network 130, such as the Internet. The gaming clients 115,120 may be implemented on one or more processors as later described herein. In some embodiments, the gaming clients 115,120 are mobile electronic devices having touchscreens thereon, such as smart phones, tablets, or laptop computers. The server device 110 and the gaming clients 115,120 may communicate in a wired or wireless manner over the network 130.

In some embodiments, the server device 110 is coupled, directly or indirectly, to a database 140 for facilitating the storage and querying of records corresponding to a plurality of game play instructions, actions, objects (e.g., virtual game pieces/characters, weapons, buildings, etc.), maps, and/or settings. The database 140 includes, among other things, a relational database or similar storage structure accessible by the server device 110. In accordance with embodiments described herein, the database 140 stores a plurality of records that each corresponds to game play instructions, actions, objects, maps, and/or settings.

The server device 110 includes a gaming server accessible by any of the gaming clients 115,120 and/or a data server for supporting an application of any of the gaming clients 115,120, over the network 130. The gaming server can support any type of application, including those that facilitate live game play. The server device 110 can further determine relationships (e.g., teams) between the gaming clients 115,120. In various embodiments, the server device 110 communicates actions commanded via one or more of the gaming clients 115,120, to another one or more of the gaming clients 115,120 for presentation thereon via user interfaces or the like, as later described herein.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, one or more private networks, and/or one or more telecommunications networks. Where network 130 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 130 is not described in significant detail.

In accordance with embodiments of the present disclosure, the server device 110 or the gaming clients 115, 120 can each be a computing device that is capable of accessing the Internet, such as the World Wide Web, and/or a telecommunications network. Either one of the server device 110 or the gaming clients 115, 120 might take on a variety of forms, such as a personal computer (PC), a laptop computer, a mobile phone, a tablet computer, a wearable computer, a personal digital assistant (PDA), an MP3 player, a global positioning system (GPS) device, a video player, a handheld communications device, a smartphone, a smart watch, a workstation, any combination of these delineated devices, or any other suitable device.

It should be understood that any number of the aforementioned devices may be employed in operating environment 100 within the scope of the present disclosure. Each may comprise a single device or multiple devices cooperating in a distributed environment. Additionally, other components not shown may also be included within the distributed environment. It should further be understood that operating environment 100 shown in FIG. 1A is an example of one suitable computing system architecture. Each of the servers, gaming clients, networks, and databases shown in FIG. 1A may be implemented via a computing device, such as computing device 700, later described with reference for FIG. 7, for example. The components may communicate with each other via network 130.

Figure 1B:
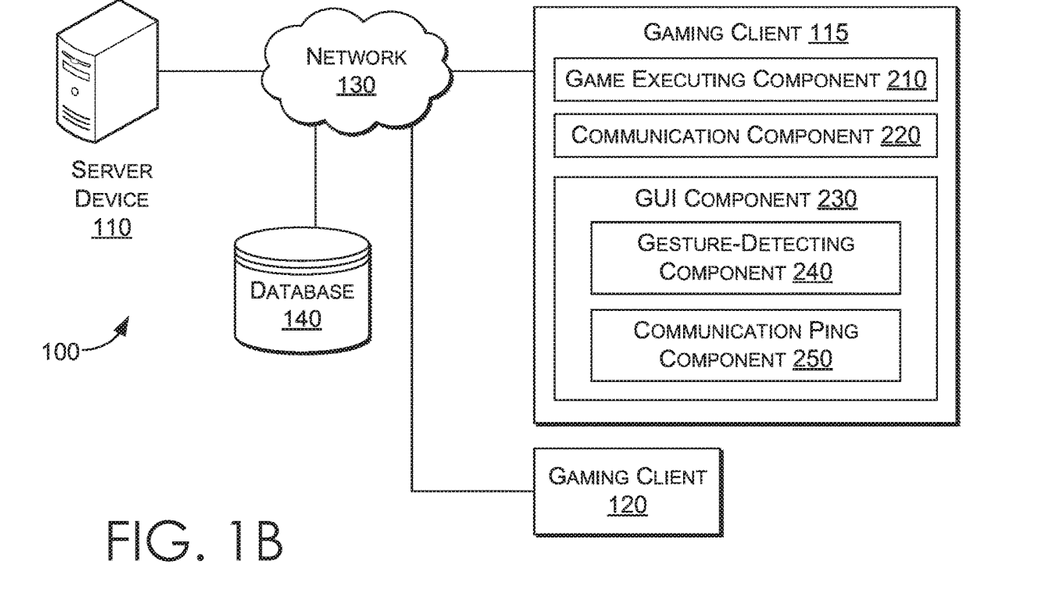
FIG. 1B is a block diagram illustrating an exemplary implementation of a system for precise positioning with touch gestures in accordance with some embodiments of the present disclosure.

Next, FIG. 1B depicts a block diagram of operational modules of an exemplary one of the gaming clients, specifically gaming client 115, in accordance with some embodiments of the present disclosure. It is noted that the depicted implementation is merely exemplary, and not intended to be limiting in any way, as each component can be arranged in various configurations, spread across a number of computing devices, combined with other components or one another, arranged to communicate over a network, or any combination of the foregoing including others not mentioned. For example, each of the operational modules may comprise a combination of hardware components and/or computer instructions stored on computer-readable media and executable on a processor thereof, as later described in regards to computing device 700 below.

As depicted in FIG. 1B, the operational modules of the gaming client 115 may comprise a game executing component 210, a communication component 220, and a graphical user interface (GUI) component 230. The game executing component 210 can be configured for executing a game associated therewith, such as MOBA games described herein. In some embodiments, executing the game may include displaying a dynamic image, such as the dynamic image 10 later described herein and depicted in FIGS. 2A-5. The communication component 220 can be configured for network communications between the gaming client 115, the gaming client 120, and/or the server device 110 via network 130.

The GUI component 230 can be configured for displaying the dynamic image and various manipulatable features therein, such as menus, virtual joysticks, fixed and/or movable objects, or the like. In some embodiments, the GUI component 230 can further comprise a gesture-detecting component 240 configured for detecting a touch gesture on a touchscreen of the gaming client 115, as later described herein. For example, the gesture-detecting component 240 can display a map in response to a beginning of detecting a touch gesture. The gesture-detecting component 240 can also respond to detecting the beginning of a gesture by displaying a depiction of an obscured portion of the map that is obscured by a player's finger or another object, as later described herein. Upon release of a touch gesture (i.e., at an end of the touch gesture), the gesture-detecting component 240 or another sub-element of the GUI component 230 can present and/or display a communication ping at the release location, as later described herein.

Specifically, the GUI component 230 can also comprise a communication ping component 250 configured for displaying on the dynamic image the communication ping (e.g., an icon, symbol, and/or text message), and can receive a location associated therewith from the gesture-detecting component 240. The communication ping component 250 can further be configured for sending information associated with the communication ping to other ones of the gaming clients, such as the gaming client 120 via the network 130. The communication ping component 250 can then send the generated communication ping to the server device 110 through the network 130 via the communication component 220 of the gaming client 115.

In some embodiments, the server device 110 can receive the communication ping, identify other gaming clients associated with teammates of a player sending the communication ping, and relay the communication ping to those other gaming clients. For example, the server 110 and/or the database 140 associated therewith can store a plurality of player identification data which correspond to one or more of the gaming clients 115,120 and/or otherwise are communicated to the server device 110 along with the communication ping. In this example, gaming clients receiving the communication ping are referred to as the receiver gaming clients (e.g., gaming client 120). The receiver gaming clients can be configured to receive the communication ping to be displayed in a dynamic image associated with the game via GUI components thereof. Specifically, the receiver gaming clients can each receive the communication ping through their corresponding communication components (e.g., substantially identical to the communication component 220), interpret the communication ping with their communication ping components (e.g., substantially identical to the communication ping component 250) to identify a map location and message of the communication ping, and then use the GUI component thereof (e.g., substantially identical to the GUI component 230) to display the communication pint at an appropriate location on the dynamic images of the receiver gaming clients. Although identified in this example as receiver gaming clients, note that components and capabilities of each of the gaming clients 115,120 may be identical to each other without departing from the scope of the technology herein. For example, the receiver gaming clients can add a communication ping which then is communicated to one or more other gaming clients.

Turning now to FIGS. 2A-4, an example depiction of a dynamic image 10 and a precision placement tool 12 for use therewith is presented on a display screen, such as a touchscreen of a mobile electronic device. The mobile electronic device can include the computing device 700 as described below and depicted in FIG. 7. Likewise, the touchscreen can comprise any of the I/O components 720 described below and depicted in FIG. 7. For example, the touchscreen can particularly comprise embodiments of I/O components 720 with gesture recognition on screen and touch recognition associated with a display of the computing device 700.

Figure 2A:
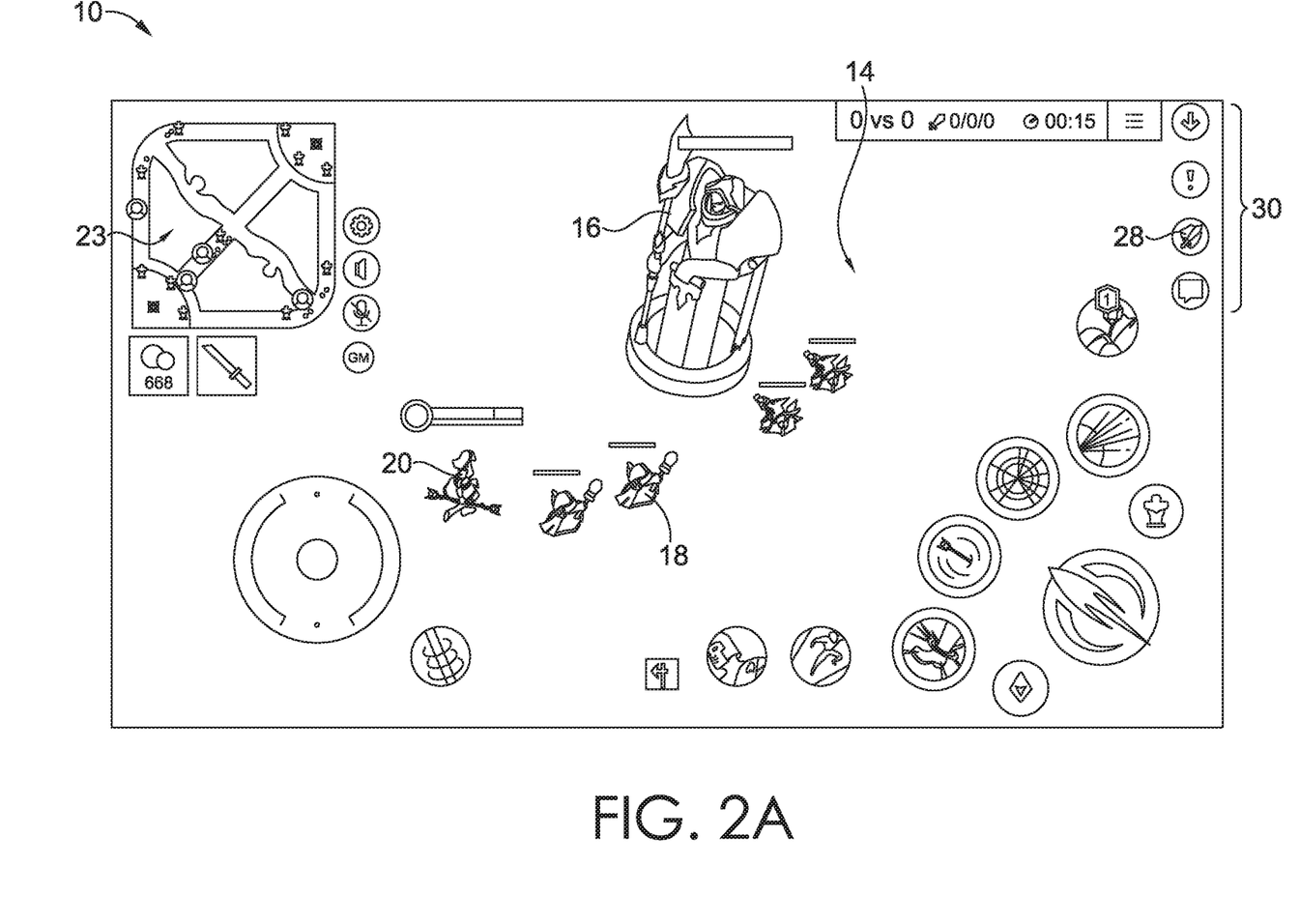
FIG. 2A is an exemplary dynamic image to be displayed on a touchscreen in accordance with some embodiments of the present disclosure.
Figure 2B:
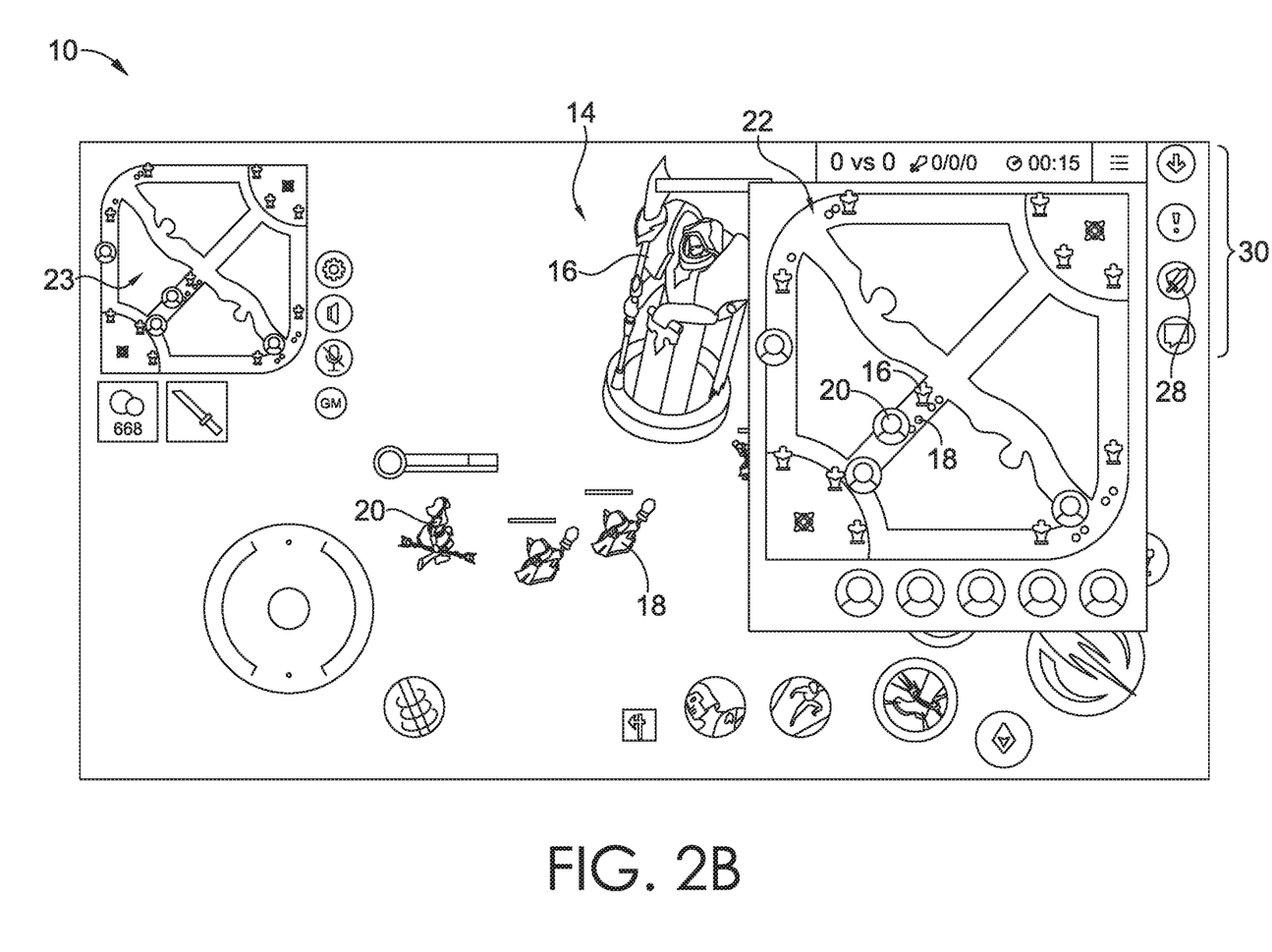
FIG. 2B is the exemplary dynamic image of FIG. 2A with a map selected by touch gestures in accordance with some embodiments of the present disclosure.

The dynamic image 10 can include movable images or images with objects movable in realtime therein, such as video images, animated images, images comprising movable game pieces, or the like. For example, as depicted in FIGS. 2A and 2B, the dynamic image 10 can include visual depictions of at least a portion of a dynamic virtual world 14 for a multiplayer game (e.g., a MOBA game or the like). The visual depictions can comprise fixed graphic objects, such as fixed graphic object 16, and movable graphic objects, such as movable graphic object 18. Visual depictions can include, among other things, animated and/or movable game pieces and/or destinations such as towers, castles, roads, pathways, walls, fences, barricades, trees, mountains, streams, weapons, targets, rewards, or the like. Game pieces, like the game piece 20 depicted in both a map 22 and the dynamic virtual world 14 in FIGS. 2A and 2B, can represent locations of various players in the multiplayer game and/or tools or weapons useable by the various players. The visual depictions can display such fixed or movable graphic objects in a perspective view and/or a plan view. However, the system and methods herein can be used within other dynamic images that are not part of a multiplayer game or a single player game without departing from the scope of the technology described herein.

In some embodiments, the dynamic image 10 can comprise a continually-displayed or selectably-displayed mini-map 23, as in FIGS. 2A and 2B. The mini-map 23 or other such graphic depiction may provide a plan view of the dynamic virtual world 14 in its entirety and/or large portions of the dynamic virtual world 14. For example, as depicted in FIG. 2A, a mini-map 23 or other icon can be continually displayed at a corner of the touchscreen and then, when selected by a touch gesture (e.g., via selection of the precision placement tool 12), the map 22 can be displayed as an enlarged version of the mini-map 23 for interaction therewith in that same corner or in another portion of the touchscreen, as depicted in FIG. 2B. By way of non-limiting example, the map 22 can be a dynamic map or other dynamic image including the fixed and/or movable graphic objects 16,18 and/or representative depictions thereof, among other things. Example embodiments described herein primarily refer to the map 22 as the dynamic image 10 to which the virtual tools (e.g., the precision placement tool 12) and methods described herein are applied. However, the virtual tools and methods described herein are also applicable to other dynamic images (e.g., the dynamic virtual world 14, videos, augmented reality images, animations, or the like) without departing from the scope of the technology herein.

Figure 3A:
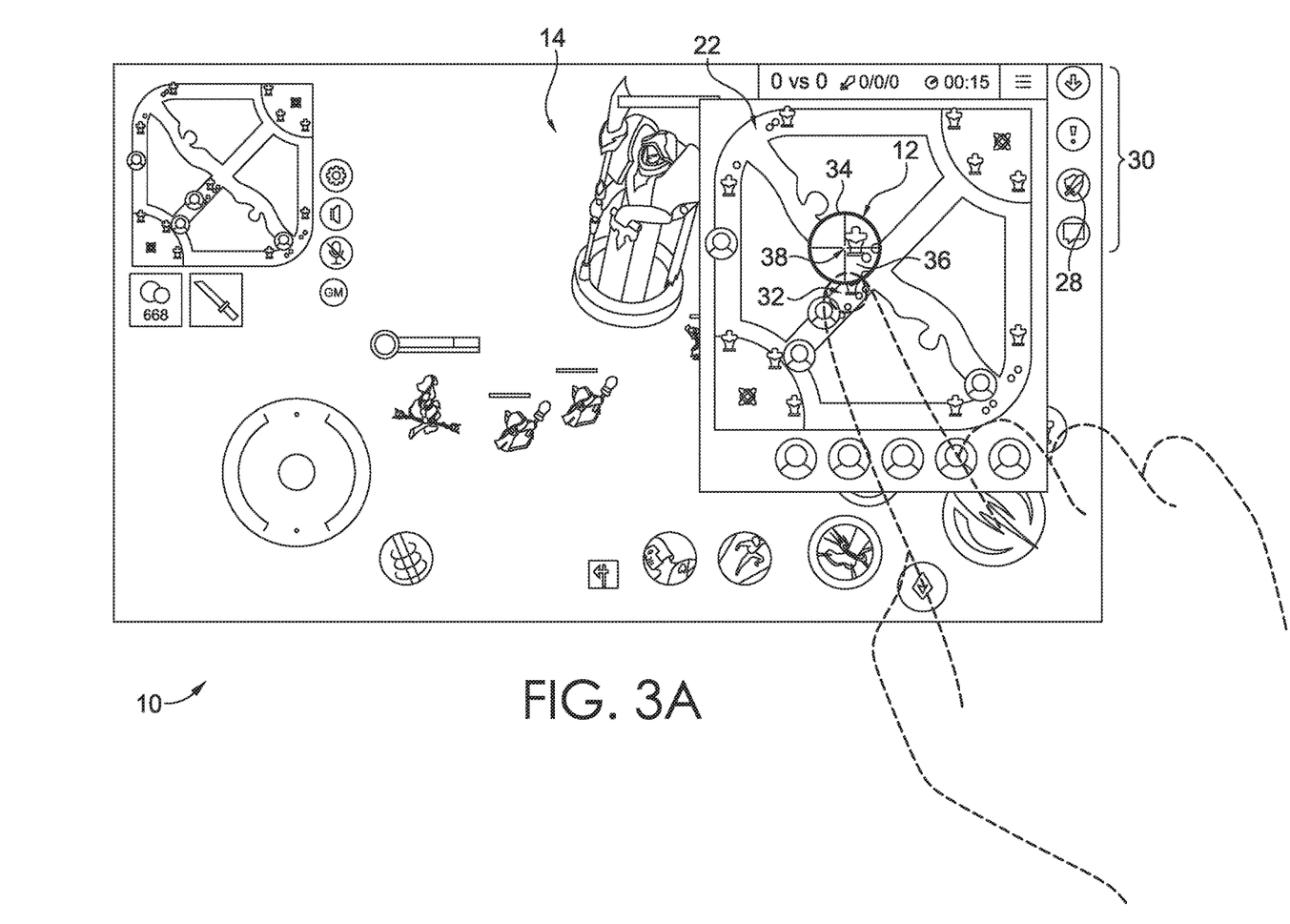
FIG. 3A is the exemplary dynamic image of FIG. 2B with a precision placement tool displaying a portion of the map in accordance with some embodiments of the present disclosure.
Figure 3B:
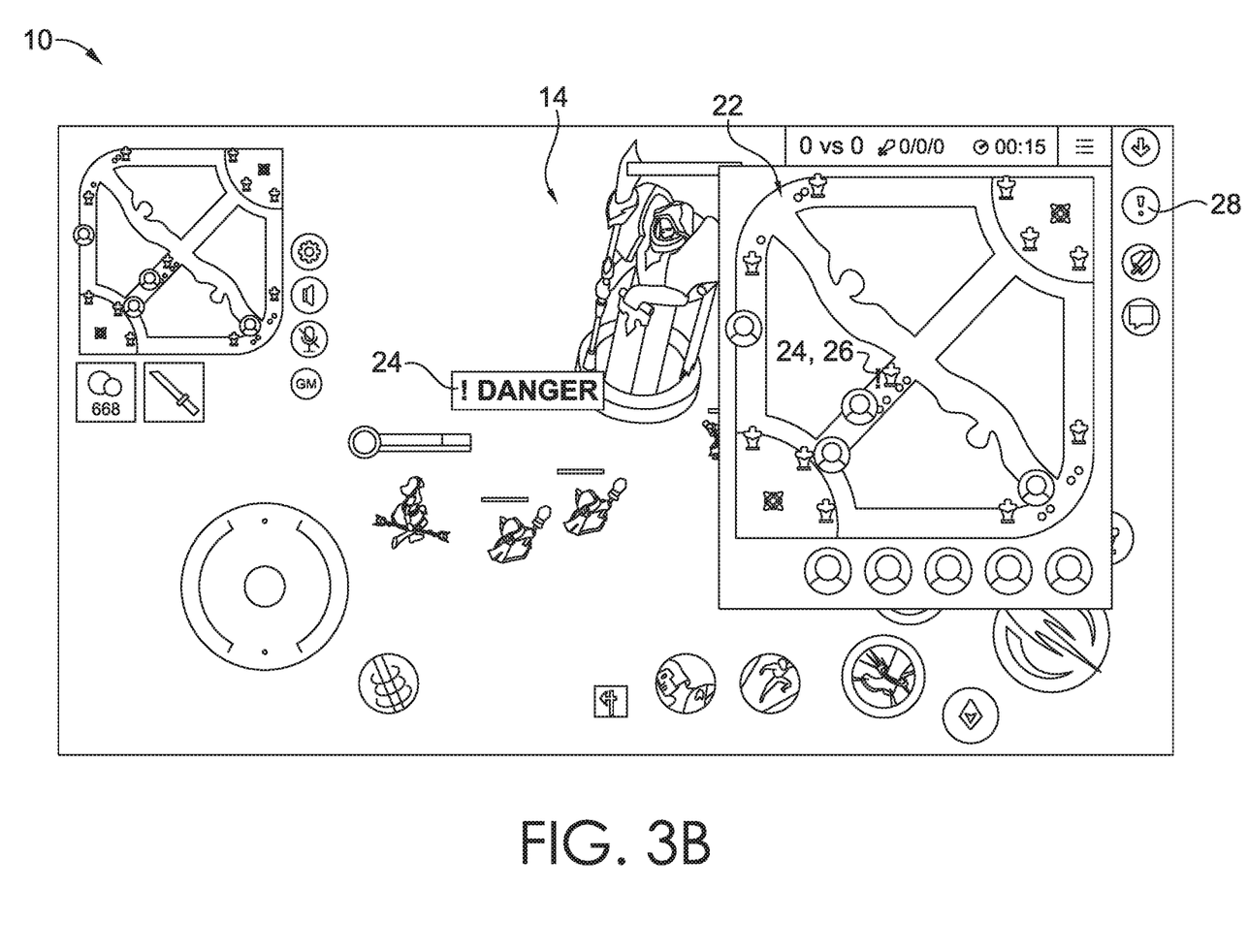
FIG. 3B is the exemplary dynamic image of FIG. 3A upon release of the precision placement tool, leaving behind a communication ping in its place in accordance with some embodiments of the present disclosure.

Turning now to FIGS. 3A and 3B, the map 22 and/or the mini-map 23 can be used to present a big-picture view of the entire dynamic virtual world 14, current conditions within that virtual world, current locations of a player's teammates, and communication pings 24 (as depicted in FIG. 3B) left by various players for teammate players, among other things. In some embodiments, a player can cause specific actions to be performed at particular locations within the dynamic virtual world 14 via the map 22, such as placement of the communication pings 24 for display by computing devices of one or more other players of the multiplayer game, and viewing by the one or more other players, as depicted in FIG. 3B. The communication pings 24 can include communication icons, symbols, graphics, and/or text announcements indicating to at least some of the players (e.g., teammates) of the multiplayer game that the player placing the communication ping 24 needs help, desires a certain action to be taken at that location (e.g., attack, bring provisions, etc.), has learned of some valuable resources or clues at that location, or the like. In some embodiments, the communication pings 24 can appear in the dynamic virtual world 14, the mini-map 23, and/or the map 22. In some further embodiments, such communication pings 24 can be applied using the precision placement tool 12.

As depicted in FIGS. 3A and 3B, the precision placement tool 12 can be used for placing such communication pings 24, commanding other in-game changes, and/or providing enhanced visuals of the map 22. The precision placement tool 12 can be selectable and movable via a touch gesture on the touchscreen. A touch gesture can include, for instance, tapping the touchscreen with one or more fingers, one or more thumbs, a stylus, or other such selection tool. Additionally or alternatively, a touch gesture can include pressing and dragging a finger, thumb, stylus, or other such selection tool across the touchscreen in a continuous fashion and/or releasing the finger, thumb, stylus, or other such selection tool from the touchscreen at a release location 26, indicating an end of the touch gesture. Specifically, the touch gesture can begin at a tool selection icon, such as the tool selection icon 28, continue into the map 22 as depicted in FIG. 3A, and end at the release location 26 within the map 22 as depicted in FIG. 3B. For example, the precision placement tool 12 can be selectable, via the touch gesture, from a menu 30 of precision placement tools or communication tools, such as the menu 30 of tool selection icons to the left of the map 22 in FIGS. 2A-5. However, other methods of selecting the precision placement tool 12 can be used without departing from the scope of the technology described herein. In some embodiments, as depicted in FIG. 3B, the precision placement tool 12 is operable to display a change to the dynamic image 10 or map 22 at the release location 26. For example, the change to the dynamic image 10 can be placement of the communication ping 24 onto the map 22 at a location within the multi-player game associated with the release location 26 on the map 22.

Referring again to FIGS. 3A and 3B, as one of ordinary skill may appreciate, a player's (i.e., a user of a computing device executing a MOBA game) touch gesture can obscure portions of the dynamic image 10 or map 22 (e.g., the player's finger or thumb can block or obscure a portion of the map 22 corresponding to a location where the touch gesture is sensed by the touchscreen). This blocked or obscured portion of the map 22 or dynamic image 10 can be referred to herein as the obscured portion 32, and is illustrated directly below a player's finger 33 displayed in broken lines in FIG. 3A. Thus, once the precision placement tool 12 is selected, and throughout the touch gesture (prior to release at the release location 26), the precision placement tool 12 and/or any visual depictions therein can be displayed outside of the obscured portion 32, allowing the player to see exactly what is being selected if the touch gesture ends at its current location.

The precision placement tool 12 can have boundaries 34 of any size or shape and can present within its boundaries 34 a revealing view 36 of the obscured portion 32 of the dynamic image 10 or map 22. In one embodiment, the precision placement tool 12 can be circular and/or can be depicted as an object, such as a magnifying glass. However, other bounding shapes can be used without departing from the scope of the technology described herein. Furthermore, the revealing view 36 of the obscured portion 32 can be enlarged or magnified in comparison with the rest of the dynamic image 10 or map 22, presenting a zoomed-in view of the obscured portion 32. However, in some embodiments, the revealing view 36 can be depicted at an identical size as displayed on the map 22 without departing from the scope of the technology herein. For example, a magnified version of the obscured portion 32 in the revealing view 36 can be advantageous on a touch-screen of a phone, since the map 22 may be small and more difficult to make out visual details. However, for larger touch-screen devices, the revealing view 36 can simply display the obscured portion 32 within the boundaries 34 thereof without magnification without departing from the scope of the technology described herein. The precision placement tool 12 can additionally or alternatively include a reticle configuration and/or a cross-hair 38 within its boundaries 34 that overlays the revealing view 36 of the obscured portion 32, as depicted in FIG. 3A.

Figure 4:
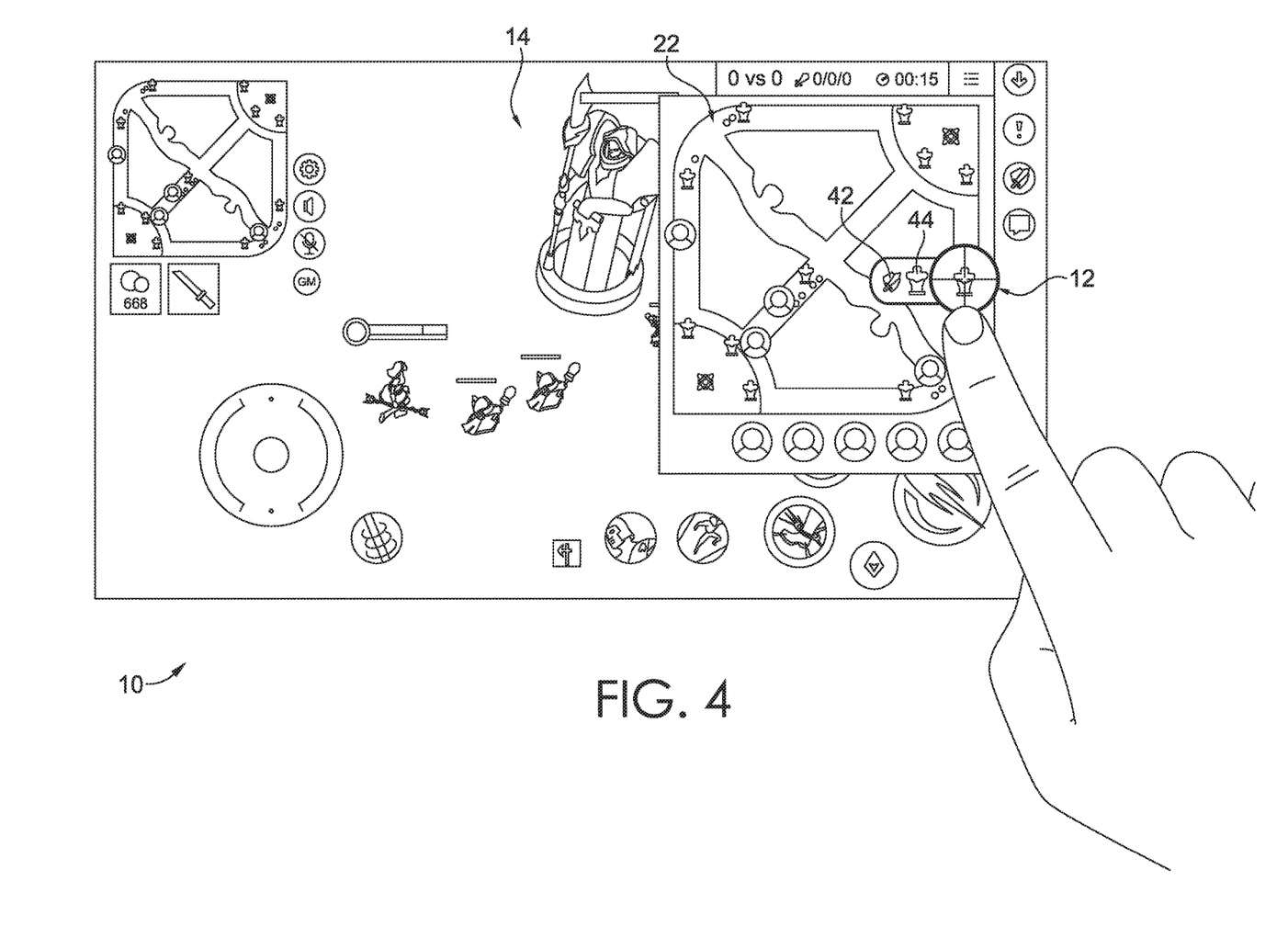
FIG. 4 is the exemplary dynamic image of FIG. 3A displaying associated visual context indicators extending from the precision placement tool while a reticle of the precision placement tool intersects with a graphic object of the map in accordance with some embodiments of the present disclosure.
Figure 5:
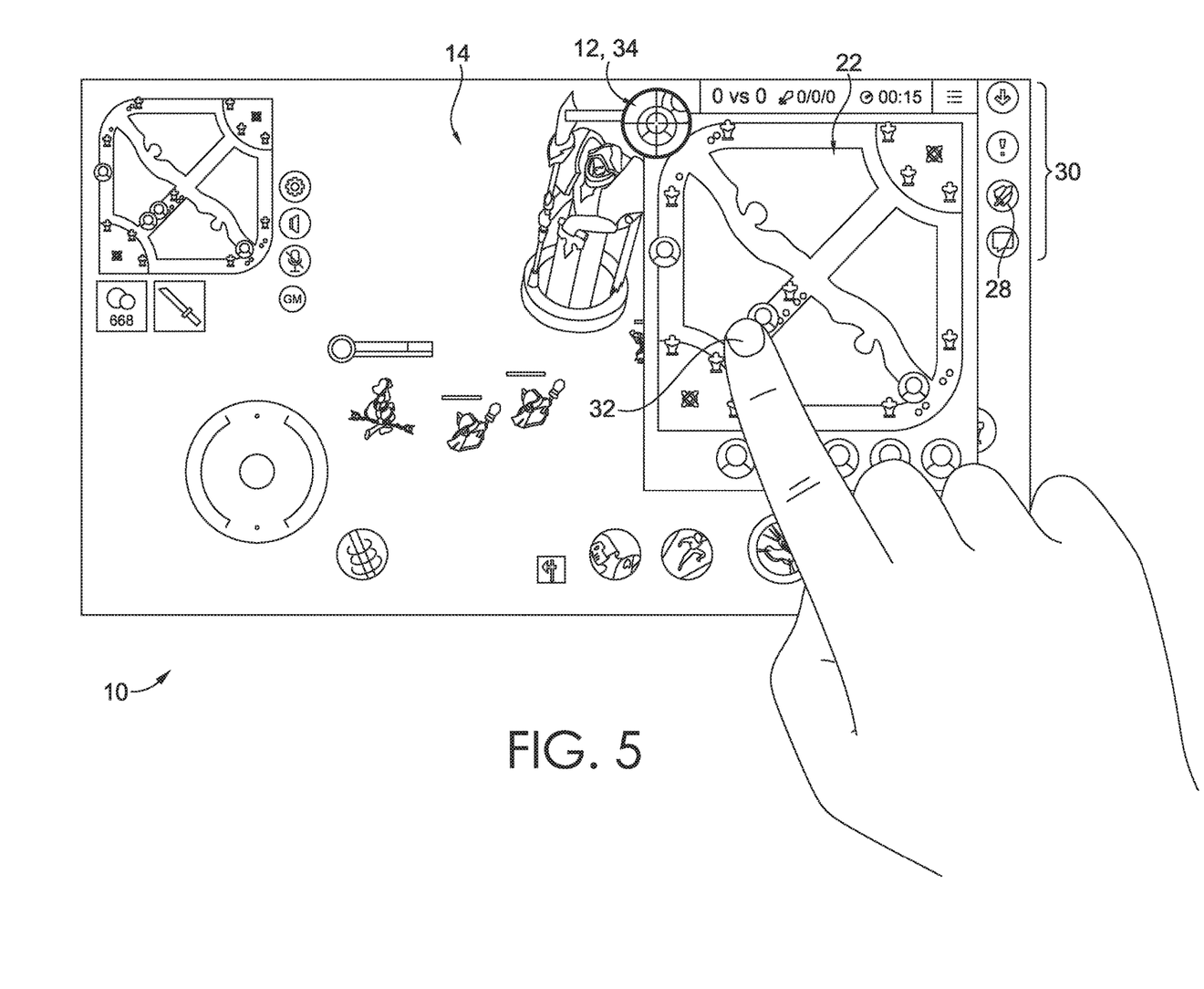
FIG. 5 is an alternative embodiment of an exemplary dynamic image with the precision placement tool fixed at a predetermined location on the map in accordance with some embodiments of the present disclosure.

In one embodiment, as illustrated in FIGS. 3A and 4, the precision placement tool 12 and the revealing view 36 therein can be displayed on the map 22, throughout the touch gesture, in a predetermined direction from the obscured portion 32 and at a predetermined distance from the obscured portion, regardless of where the obscured portion 32 is on the map 22. Furthermore, the precision placement tool 12 can further comprise a connecting graphic (not shown) that extends from the obscured portion 32 on the map 22 to the boundaries 34 of the precision placement tool 12 and/or to the revealing view 36 therein. For example, the connecting graphic can resemble a handle of a magnifying glass or can resemble a tail of a speech bubble that narrows as it approaches the obscured portion 32. Alternatively, as depicted in FIG. 5, the precision placement tool 12 and/or the revealing view 36 therein is displayed in a fixed, pre-determined location on the touchscreen, regardless of a location of the obscured portion 32 throughout the touch gesture. For example, the precision placement tool 12 and/or the revealing view 36 therein can be fixed at an upper left-hand corner of the map 22, displaying an enlarged depiction of the obscured portion 32 of the map 22.

In some embodiments, as depicted in FIG. 4, one or more visual context indicators 42,44 can be displayed at or proximate to the precision placement tool 12 during the touch gesture. The visual context indicators 42,44 can be icons extending from any side of the precision placement tool 12 or the revealing view 36 therein, and/or can include a change in appearance or a change in color of the boundaries 34 around the revealing view 36. In some embodiments, the visual context indicators 42,44 can visually communicate to the player what type of action will be performed to the dynamic image 10, map 22, or dynamic virtual world 14 associated therewith at the release location 26. In some embodiments, the visual context indicators 42,44 can comprise a signal type visual context indicator 42 and a target type visual context indicator 44. Specifically, the signal type visual context indicator 42 can communicate a signal type to be communicated over a network to players (such as teammates in the multiplayer game) at the release location when the touch gesture ends/is released. Likewise, the target type visual context indicator 44 can communicate to players a target object on the map that the signal type will be associated with at the release location. For example, an "attack" icon, as depicted in FIG. 4 can be a signal type, and a "tower" icon can appear when a cross-hair is centered over a tower depicted on the map 22. That is, when a particular portion of the reticle or cross-hair 38 overlays specific ones of the fixed graphic objects 16 (e.g., one of the towers) or movable graphic objects 18 of the map 22, one of the visual context indicators 42,44, such as the target type visual context indicator 44, can be altered or can be displayed at, around, or proximate to the precision placement tool 12. Additionally or alternatively, the boundaries 34 can be altered in shape, color, style, or the like to indicate that the precision placement tool 12 overlays a particular target object (e.g., fixed or movable graphic objects 16,18).

Figure 6:
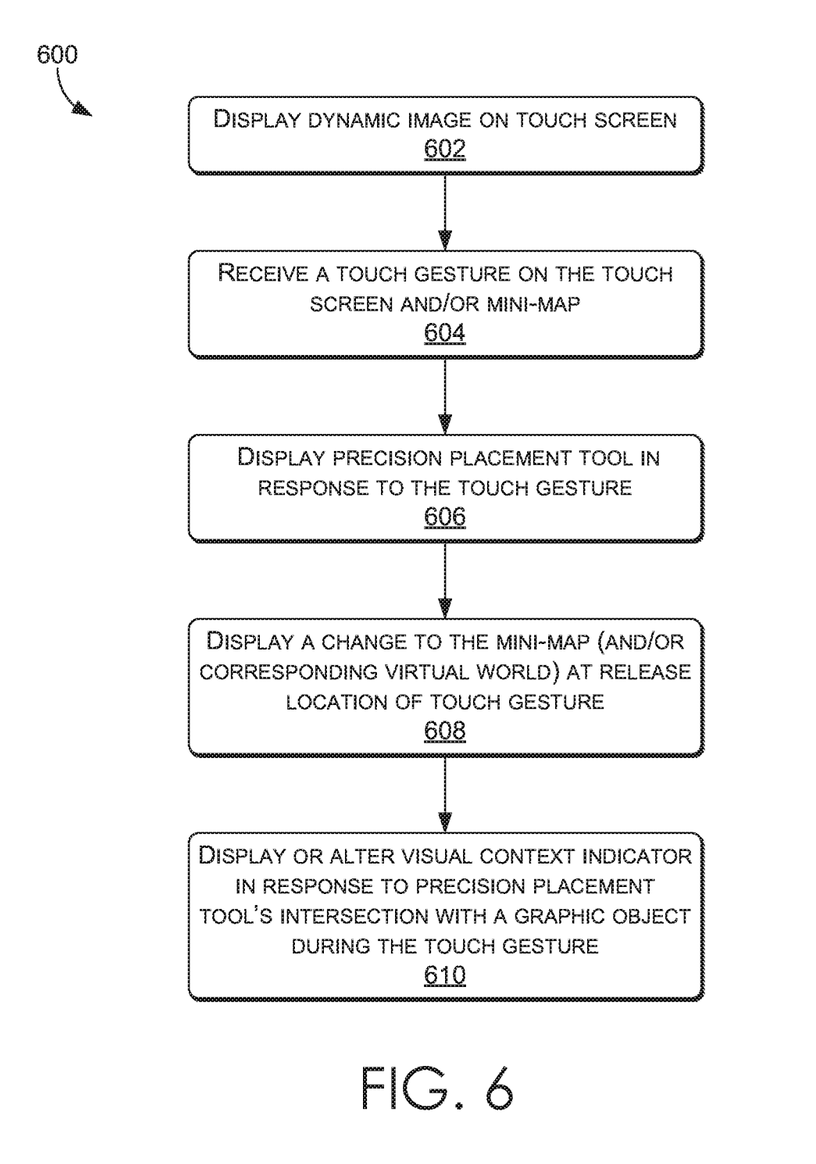
FIG. 6 is a flow diagram depicting a method for precise positioning with touchscreen gestures in accordance with some embodiments of the present disclosure.

Now referring to FIG. 6, each block of method, described herein, comprises a computing process that can be performed using any combination of hardware, firmware, and/or software. For instance, various functions can be carried out by a processor executing instructions stored in memory. The method can also be embodied as computer-usable instructions stored on computer storage media. The method 600 can be provided by a standalone application, a service or hosted service (standalone or in combination with another hosted service), or a plug-in to another product, to name a few. For example, as described herein, the method 600 is a virtual tool within other software such as a virtual game. In addition, the method 600 is described, by way of example, with respect to the dynamic image 10 or map 22 on the touchscreen of FIGS. 1-5. However, these methods can additionally or alternatively be executed by any one system, or any combination of systems, including, but not limited to, those described herein.

Now referring to FIG. 6, a flow diagram depicts a method 600 for precise location selection within a dynamic image, in accordance with some embodiments of the present disclosure. In accordance with various embodiments, the method 600 can be employed to accurately define a very location-specific communication ping to be transmitted to other computing devices within a network. As depicted in block 602, the method 600 can comprise a step of displaying the dynamic image 10 on the touchscreen. The dynamic image 10, as described above, can include the map 22 or other dynamic images with the fixed and movable graphic objects 16,18 therein. For example, the map 22 can be opened by a tap or click onto a map icon (not shown), or the map 22 can remain open throughout game play in the multiplayer game manipulated via the touchscreen.

Furthermore, as depicted in block 604, the method 600 can comprise receiving a touch gesture on the touchscreen and/or the displayed dynamic image 10 (e.g., within the map 22). The touch gesture can begin at the tool selection icon 28 and end at the release location 26 within the dynamic image 10, as described above. For example, the touch gesture can be received by the touchscreen when the player touches a finger to the touchscreen at the tool selection icon 28 and drags that finger over portions of the map 22. A location on the map 22 at which the player releases or removes the finger from the touchscreen is the release location 26 where some action occurs, as described below.

As depicted in block 606, the method 600 can also comprise, in response to the touch gesture, displaying the precision placement tool 12 that depicts a portion of the dynamic image 10 (e.g., a portion of the map 22) obscured by the received touch gesture. The revealing view 36 is displayed outside of the obscured portion 32, such as at a fixed location on the map or a set distance away from the obscured portion 32 throughout the touch gesture, as described above. The revealing view 36 can be an enlarged depiction of the obscured portion 32. In some embodiments, the revealing view 36 can be enlarged to include additional details not provided and/or not viewable in the map 22 without the precision placement tool 12. The step of block 606 can further include displaying the visual context indicators 42,44 as part of or in conjunction with the precision placement tool 12. As noted above, the visual context indicators 42,44 can include icons, colors, symbols, text, or the like that communicate to the player what type of action will be performed to the map 22 or corresponding dynamic virtual world 14 at a point on the map 22 or within the dynamic virtual world 14 where the touch gesture ends (i.e., at the release location 26).

In some embodiments, as depicted in block 608, the method 600 can further comprise displaying a change to the dynamic image 10 (e.g., the map 22 or corresponding dynamic virtual world 14) at the release location 26. For example, this change can be a placement of a communication ping 24 onto the dynamic image 10, map 22, or corresponding dynamic virtual world 14. The communication ping 24 can be viewable by a plurality of players in the multi-player game at a location associated with the release location 26 within the multi-player game or the dynamic virtual world 14 thereof.

Furthermore, some embodiments of the method 600 can comprise, in response to the reticle or cross-hair 38 of the precision placement tool 12 intersecting one of the fixed or movable graphic objects 16,18 during the touch gesture, displaying or visually altering the visual context indicator (e.g., the target type visual context indicator 44) associated with the one of the fixed or movable graphic objects 16,18, as depicted in block 610. For example, one of the visual context indicators 42,44 extending from the precision placement tool 12 can represent and/or communicate to a player a signal type to be communicated to the player's teammates at the release location 26. Likewise, another one of the visual context indicators 42,44 extending from the precision placement tool 12 can represent and/or communicate to a player a target object on the map 22, such as a tower or barricade. However, the target type visual context indicator 44 can only appear when the reticle or cross-hair 38 of the precision placement tool 12 intersect with particular ones of the fixed and/or movable graphic objects 16,18 on the map 22. Thus, in this embodiment, if the touch gesture is released while the target type visual context indicator 44 is present, the corresponding signal type can be associated with that target object at the release location 26 within the map 22 and/or within the corresponding dynamic virtual world 14. In various embodiments, the signal type can correspond with certain communication pings 24 or messages appearing to a player's teammates, a specific one of other teammates, and/or all other players of the multiplayer game.

Figure 7:
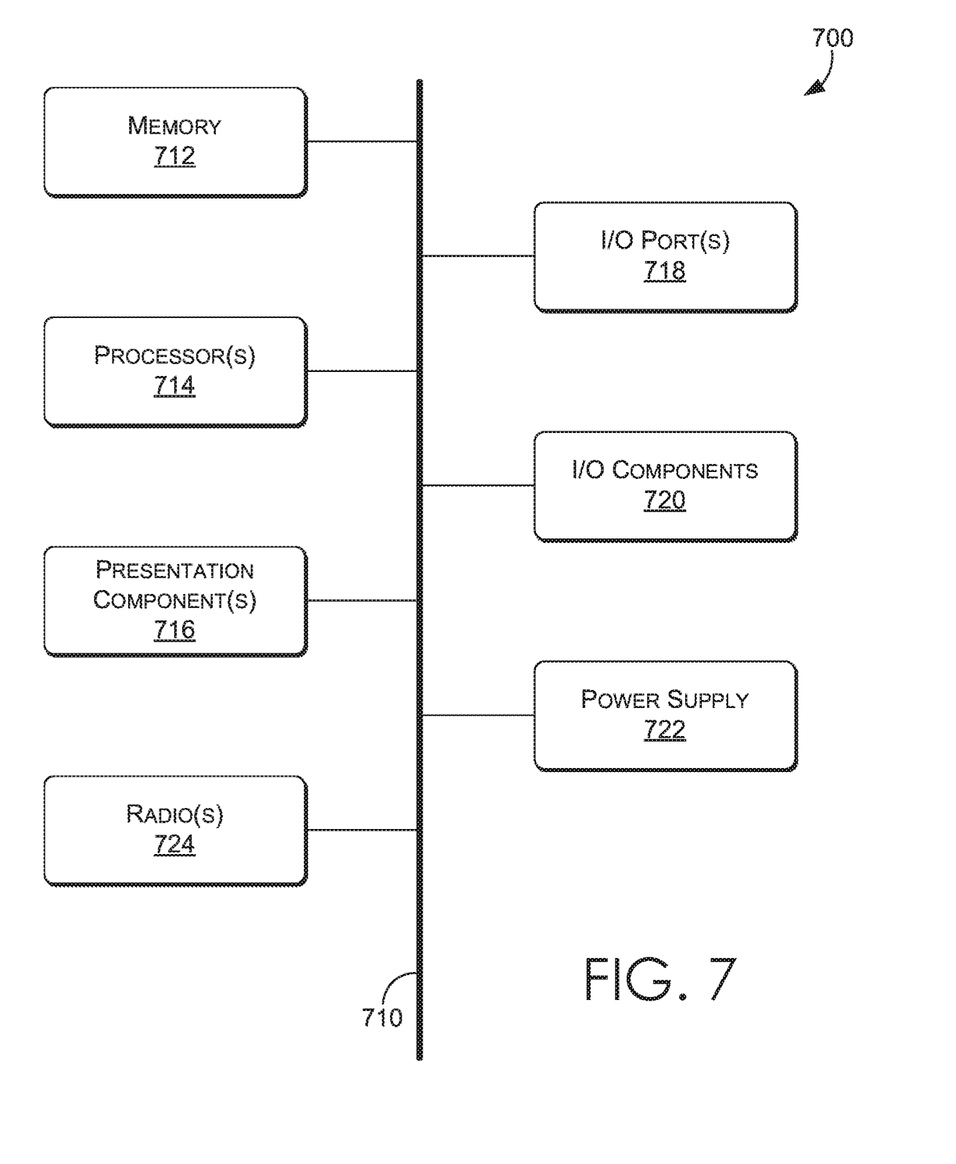
FIG. 7 is a block diagram of an exemplary computing environment suitable for use in implementing some embodiments of the present disclosure.

Having described embodiments of the present disclosure, an exemplary operating environment in which embodiments of the present disclosure can be implemented is described below in order to provide a general context for various aspects of the present disclosure. Referring initially to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the disclosed embodiments. Neither should the computing device 700 be interpreted as having any dependency or requirement relating to any one or combination of components illustrated.

The embodiments herein can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments can be practiced in a variety of system configurations, including hand-held devices, consumer electronics, general-purpose computers, more specialty computing devices, etc. The described embodiments can also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output (I/O) components 720, and an illustrative power supply 722. In some example embodiments, the computing device 700 can be or can comprise a mobile electronic device such as a smart phone, tablet, touchscreen laptop, or the like. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 616 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 can be equipped with depth cameras, such as stereoscopic camera systems, infrared camera systems, RGB camera systems, touchscreen technology, and combinations of these, for gesture detection and recognition. Additionally, the computing device 700 can be equipped with accelerometers or gyroscopes that enable detection of motion. The output of the accelerometers or gyroscopes can be provided to the display of the computing device 700 to render immersive augmented reality or virtual reality.

As can be understood, embodiments of the present disclosure provide for, among other things, systems and methods for precise positioning on a touchscreen. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that embodiments of the present disclosure are one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

The invention claimed is:

1. A computer-implemented method for precise location selection of a dynamic image, the method comprising:
    displaying a graphical user interface (GUI) including the dynamic image on a touchscreen;
    receiving a touch gesture on the displayed GUI, wherein the touch gesture begins at a tool selection icon that is separate from the dynamic image and ends at a release location within the dynamic image; and
    as the touch gesture is being received over a portion of the dynamic image and the portion is being obscured by the touch gesture, displaying a precision placement tool that depicts the obscured portion of the dynamic image.

2. The computer-implemented method of claim 1, wherein the depiction is an enlarged depiction of the obscured portion of the dynamic image.

3. The computer-implemented method of claim 1, wherein the dynamic image is a dynamic map depicting both fixed and movable graphic objects of a multi-player game.

4. The computer-implemented method of claim 3, further comprising displaying a change to the dynamic image at the release location on the dynamic image.

5. The computer-implemented method of claim 4, wherein the change to the dynamic image is a placement of a communication ping onto the dynamic image, wherein the communication ping is viewable by a plurality of players in the multi-player game at a location within the multi-player game associated with the release location.

6. The computer-implemented method of claim 3, wherein the precision placement tool further depicts a reticle as an overlay to the depiction.

7. The computer-implemented method of claim 6, further comprising, in response to the reticle intersecting one of the fixed or movable graphic objects, displaying or visually altering a visual context indicator associated with the one of the fixed or movable graphic objects.

8. The computer-implemented method of claim 1, wherein the depiction is displayed in a fixed, pre-determined location on the touchscreen regardless of a location of the obscured portion.

9. The computer-implemented method of claim 1, wherein the precision placement tool comprises an enlarged depiction of the portion of the dynamic image obscured and one or more visual context indicators communicating what type of action will be performed to the dynamic image at the release location on the dynamic image.

10. The computer-implemented method of claim 9, wherein the one or more visual context indicators communicate at least one of the following:
    a signal type to be communicated to a plurality of players in a multiplayer game associated with the dynamic image at the release location, and
    a target object on the dynamic image that the signal type will be associated with at the release location.

11. A non-transitory computer storage medium storing computer-useable instructions that, when used by one or more computing devices, cause the one or more computing devices to perform operations comprising:
- displaying a graphical user interface (GUI) including the dynamic image on a touchscreen;
- receiving a touch gesture on the displayed GUI, wherein the touch gesture begins at a tool selection icon that is separate from the dynamic image and ends at a release location within the dynamic image;
- as the touch gesture is being received over a portion of the dynamic image and the portion is being obscured by the touch gesture, displaying a precision placement tool that depicts the obscured portion of the dynamic image, wherein the depiction is an enlarged depiction of the obscured portion and is displayed outside of the obscured portion; and
- displaying a change to the dynamic image at the release location on the dynamic image when the touch gesture ends.

12. The non-transitory computer storage medium of claim 11, wherein the depiction is displayed in a fixed, predetermined location on the touchscreen regardless of a location of the obscured portion.

13. The non-transitory computer storage medium of claim 11, wherein the depiction is displayed in a predetermined direction and distance from the obscured portion throughout the touch gesture and the precision placement tool further comprises a connecting graphic that extends from the obscured portion to the depiction.

14. The non-transitory computer storage medium of claim 11, wherein the precision placement tool comprises one or more visual context indicators communicating what type of action will be performed to the dynamic image at the release location on the dynamic image.

15. The non-transitory computer storage medium of claim 14, wherein the one or more visual context indicators communicate at least one of the following:
- a signal type to be communicated to a plurality of players in a multiplayer game associated with the dynamic image at the release location, and
- a target object on the dynamic image that the signal type will be associated with at the release location.

16. The non-transitory computer storage medium of claim 11, wherein the dynamic image is a dynamic map depicting both fixed and movable graphic objects of a multi-player game and the change to the dynamic image is a placement of a communication ping onto the dynamic image, wherein the communication ping is viewable by a plurality of players in the multi-player game at a location within the multi-player game associated with the release location.

17. The non-transitory computer storage medium of claim 11, wherein the precision placement tool further depicts a reticle as an overlay to the depiction.

18. The non-transitory computer storage medium of claim 17, wherein the computer-useable instructions further cause the one or more computing devices to perform: displaying or visually altering, in response to the reticle intersecting a particular one of the fixed or movable graphic objects, a visual context indicator associated with the particular one of the fixed or movable graphic objects.

19. A system for precise location selection of a dynamic image, the system comprising:
- at least one processor;
- at least one data storage device communicably coupled with the at least one processor, wherein the data storage device comprises a non-transitory computer storage medium storing computer-useable instructions that, when used by the at least one processor, causes the at least one processor to perform operations comprising:
- displaying a graphical user interface (GUI) including the dynamic image on a touchscreen, wherein the dynamic image includes a dynamic map depicting both fixed and movable graphic objects of a multiplayer game;
- receiving a touch gesture on the displayed dynamic image, wherein the touch gesture begins at a tool selection icon that is separate from the dynamic image and ends at a release location within the dynamic image;
- as the touch gesture is being received over a portion of the dynamic image and the portion is being obscured by the touch gesture, displaying a precision placement tool that depicts the obscured portion of the dynamic image, wherein the depiction is an enlarged depiction of the obscured portion and is displayed outside of the obscured portion, wherein the precision placement tool further comprises one or more visual context indicators communicating what type of action will be performed to the dynamic image at the release location on the dynamic image; and
- displaying a change to the dynamic image at the release location on the dynamic image when the touch gesture ends corresponding to the action.

20. The system of claim 19, wherein the precision placement tool further depicts a reticle as an overlay to the depiction, wherein the computer-useable instructions further cause the at least one processor to perform: displaying or visually altering, in response to the reticle intersecting a particular one of the fixed or movable graphic objects, a visual context indicator associated with the particular one of the fixed or movable graphic objects.

* * * * *